United States Patent
Park et al.

(10) Patent No.: US 7,450,189 B2
(45) Date of Patent: Nov. 11, 2008

(54) LIQUID CRYSTAL DISPLAY DEVICE HAVING CAPACITOR FORMED WITH SHORTING BAR

(75) Inventors: Soon Young Park, Kyoungsangnam-do (KR); Deok Won Lee, Sungnam-shi (KR)

(73) Assignee: LG Display Co., Ltd., Seoul (KR)

( * ) Notice: Subject to any disclaimer, the term of this patent is extended or adjusted under 35 U.S.C. 154(b) by 472 days.

(21) Appl. No.: 10/673,465

(22) Filed: Sep. 30, 2003

(65) Prior Publication Data
US 2004/0125256 A1    Jul. 1, 2004

(51) Int. Cl.
*G02F 1/1333* (2006.01)
*G02F 1/1343* (2006.01)

(52) U.S. Cl. .............................. 349/40; 349/38; 349/141
(58) Field of Classification Search .............. 349/38–40
See application file for complete search history.

(56) References Cited

U.S. PATENT DOCUMENTS 5,686,976 A * 11/1997 Nishikawa ................... 349/38
6,333,769 B1 * 12/2001 Suzuki et al. ................. 349/40
6,411,351 B1 * 6/2002 Zhang et al. .................. 349/54
2001/0052949 A1 * 12/2001 Yamaguchi et al. ........... 349/39

FOREIGN PATENT DOCUMENTS

| JP | 06-317810 | 11/1994 |
| JP | 09-146112 | 6/1997 |
| JP | 10-010494 | 1/1998 |

* cited by examiner

*Primary Examiner*—Andrew Schechter
*Assistant Examiner*—Nathanael R Briggs
(74) *Attorney, Agent, or Firm*—McKenna Long & Aldridge LLP

(57) ABSTRACT

There is disclosed a liquid crystal display that is adaptive for improving picture quality by eliminating residual DC components within a horizontal electric field type liquid crystal display panel. A liquid crystal display device according to an embodiment of the present invention includes a substrate defined as a display part and a non-display part; a gate line formed on the substrate; a common line substantially parallel to the gate line; a data line crossing the gate line and the common line while being insulated, to define a pixel area; and at least one capacitor located in the non-display part and connected to at least one of the gate line, the common line and the data line for storing a remaining component of the display part and eliminating the stored component.

20 Claims, 6 Drawing Sheets

LIQUID CRYSTAL DISPLAY DEVICE HAVING CAPACITOR FORMED WITH SHORTING BAR

This application claims the benefit of Korean Patent Application No. 2002-88203, filed on Dec. 31, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display that is adaptive for improving picture quality by eliminating residual DC components within a horizontal electric field type liquid crystal display panel.

2. Discussion of the Related Art

Generally, liquid crystal display devices display a natural-like motion picture using thin film transistors TFT as switching devices. Such liquid crystal display devices can be made small-sized in comparison to cathode ray tubes CRT and have been commercialized as potable televisions, notebook computers and the monitors of personal computers.

The liquid crystal display device displays pictures corresponding to video signals like television signals in a pixel matrix or picture element matrix where pixels are arranged at each crossing area of gate lines and data lines. Each pixel includes a liquid crystal cell that controls the amount of transmitted light in accordance with the voltage level of a data signal. The TFT is installed at the crossing area of the gate line and the data line and switches the data signal, which is to be transmitted to the liquid crystal cell, in response to a scan signal, i.e., gate pulse, from the gate line.

Such liquid crystal display device can be classified into a vertical electric field type liquid crystal display device and a horizontal electric field type liquid crystal display device in accordance with the direction of electric field by which liquid crystal is driven, wherein the vertical electric field type liquid crystal display device has an electric field of vertical direction applied and the horizontal electric field type liquid crystal display device has an electric field of horizontal direction applied and a viewing angle widened.

The horizontal electric field type liquid crystal display device, differently from the vertical electric field type liquid crystal display device, has the liquid crystal within a pixel cell rotate on the basis of the horizontal direction by the horizontal electric field, thus there is an advantage that the viewing angle is wide.

FIG. 1 is a diagram representing a signal line of a horizontal electric field type liquid crystal display device of the related art.

Referring to FIG. 1, a lower substrate 2 provided with a TFT array includes a plurality of common lines CL1 to CLm to apply common voltages Vcom to common electrodes, a plurality of gate lines GL1 to GLm to apply gate voltages to gate electrodes, and a plurality of data lines DL1 to DLn to apply data voltages to pixel electrodes.

The common lines CL1 to CLm are a number m of lines formed parallel to the gate lines GL1 to GLm.

The gate lines GL1 to GLm are a number m of lines formed alternate with and parallel to the common lines CL1 to CLm and apply the gate voltages to the gate electrodes of the TFTs.

The data lines DL1 to DLn are a number n of lines formed perpendicularly to the gate lines GL1 to GLm. The data lines DL1 to DLn apply data signals to pixel electrodes through the drain electrodes of the TFTs. Pixel areas are formed at the intersection area of the common line CL and the gate line GL that cross the data line DL. Thin film transistors are also formed at the crossing area of the data line DL and the gate line GL.

Supply lines SL are formed at both sides of the lower substrate 2 in a perpendicular direction at least to the gate lines GL1 to GLm. The supply lines SL apply common voltages to the common line CL. A static electricity prevention circuit 4 and 8 is installed between the supply line SL and signal lines including the gate line GL, the data line DL and the common line CL.

The gate lines GL1 to GLm and the data lines DL1 to DLn of the horizontal electric field type liquid crystal display device of the related art are frequently broken because of manufacturing tolerance and operational error. When the gate line GL1 to GLm is broken, some of the TFTs are not driven. When the data line DL1 to DLn is broken, the data signal is not applied to some of the TFTs. To determine if there are broken lines in the gate lines GL1 to GLm and the data lines DL1 to DLn, the TFT array substrate is inspected with a test circuit (not illustrated). After completing the test, a residual DC component within the liquid crystal display panel is bypassed through the supply line SL to be eliminated.

On the other hand, whether the TFT runs normal or not is detected with an output voltage value obtained by applying voltage to each of a gate shorting bar 12 and a data shorting bar 10 in order to test the operation of the TFT.

The gate shorting bar 12 is connected to at least any one of the gate lines GL and the common lines CL, and the data shorting bar 10 is connected to the data DL. At least any one of the gate line GL and the common line GL connected to the gate shorting bar 12 is connected to the supply line SL through a static electricity prevention circuit 4 and the data line DL connected to the data shorting bar 10 is connected to the supply line SL through the static electricity prevention circuit 4. The supply line SL surrounds the display area of the lower substrate 2 and is connected to the static electricity prevention circuit 4 and 8 that is formed at both ends of each of the data line DL, the gate line GL and the common line CL.

In this way, the related art liquid crystal display panel has a bypass loop formed through the supply line SL. A DC component and a power off signal remaining within the liquid crystal display panel is bypassed through the bypass loop and naturally discharged.

However, if there is poor a contact between the bypass loop and the signal lines or if there is a defect in the bypass loop, the remaining DC component is applied to the display area of the liquid crystal display panel causing contaminant within the liquid crystal display panel to be excited, thereby deteriorating picture quality in the display area. Specifically, stains appear particularly around a liquid crystal injection hole (not shown), thus the picture quality is deteriorated.

SUMMARY OF THE INVENTION

Accordingly, the present invention is directed to a liquid crystal display device that substantially obviates one or more of the problems due to limitations and disadvantages of the related art.

Accordingly, it is an advantage of the present invention to provide a liquid crystal display that is adaptive for improving picture quality by eliminating residual DC components within a horizontal electric field type liquid crystal display panel.

In order to achieve these and other advantages of the invention, a liquid crystal display device according to an aspect of the present invention includes a substrate defined as a display part and a non-display part; a gate line formed on the substrate; a common line formed parallel to the gate line; a data line crossing the gate line and the common line while being insulated, to determine a pixel area; and at least one capacitor located in the non-display part and connected to at least one of the gate line, the common line and the data line for storing up a remaining component of the display part and eliminating the stored component.

The liquid crystal display device further includes a common electrode formed in the display part of the substrate and connected to the common line; a thin film transistor formed at an intersection area of the gate line and the data line; a gate insulating film formed between the gate line and the data line; a protective film formed on the gate insulating film for protecting the thin film transistor; and a pixel electrode connected to the thin film transistor to form a horizontal electric field with the common electrode.

The capacitor includes a first capacitor connected to at least one of the gate line and the common line; and a second capacitor connected to the data line.

The liquid crystal display device further includes a first static electricity prevention means formed in the non-display part of the substrate and connected to the first capacitor; and a second static electricity prevention means formed in the non-display part of the substrate and connected to the second capacitor.

The first capacitor includes a first shorting bar connected to the first static electricity prevention means; at least one layer of insulating film formed on the first shorting bar; and a first dummy line formed to overlap the first shorting bar on the at least one layer of insulating film.

Herein, the first shorting bar is formed of the same metal as any one of the gate line and the data line.

Herein, the first dummy line is formed of the same metal as the pixel electrode.

Herein, the at least one layer of insulating film is the gate insulating film and the protective film.

Herein, the at least one layer of insulating film is the protective film.

The second capacitor includes a second shorting bar connected to the second static electricity prevention means; at least one layer of insulating film formed on the second shorting bar; and a second dummy line formed to overlap the second shorting bar on the at least one layer of insulating film.

Herein, the second shorting bar is formed of the same metal as any one of the gate line and the data line.

Herein, the second dummy line is formed of the same metal as the pixel electrode.

Herein, the at least one layer of insulating film is the gate insulating film and the protective film.

Herein, the at least one layer of insulating film is the protective film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute apart of this specification, illustrate embodiments of the invention and together with the description serve to explain the principles of the invention.

In the drawings.

DETAILED DESCRIPTION OF THE ILLUSTRATED EMBODIMENT

Reference will now be made in detail to the embodiments of the present invention, examples of which are illustrated in the accompanying drawings.

Figure 1:
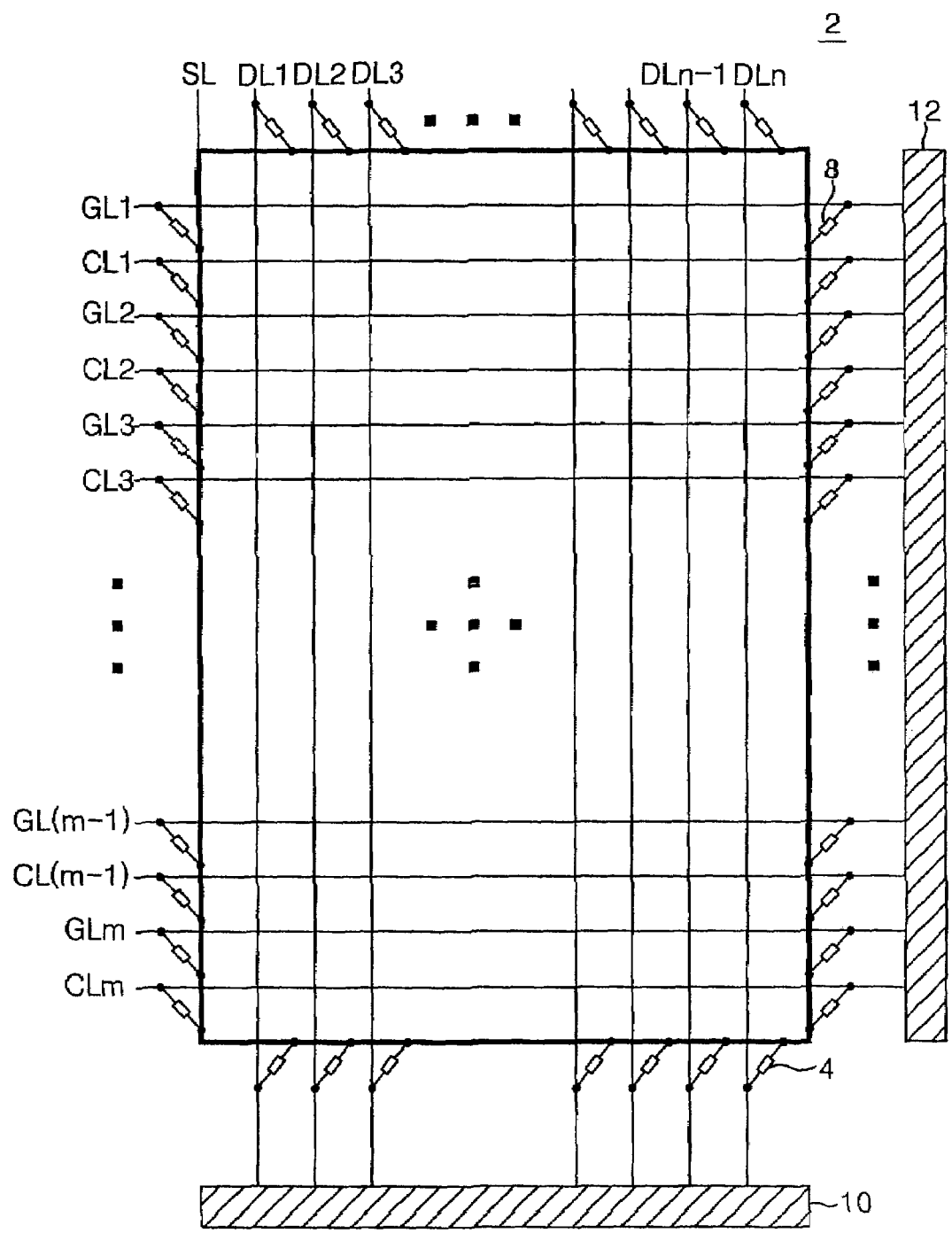
FIG. 1 a plan view representing a horizontal electric field type liquid crystal display device of the related art.
Figure 2:
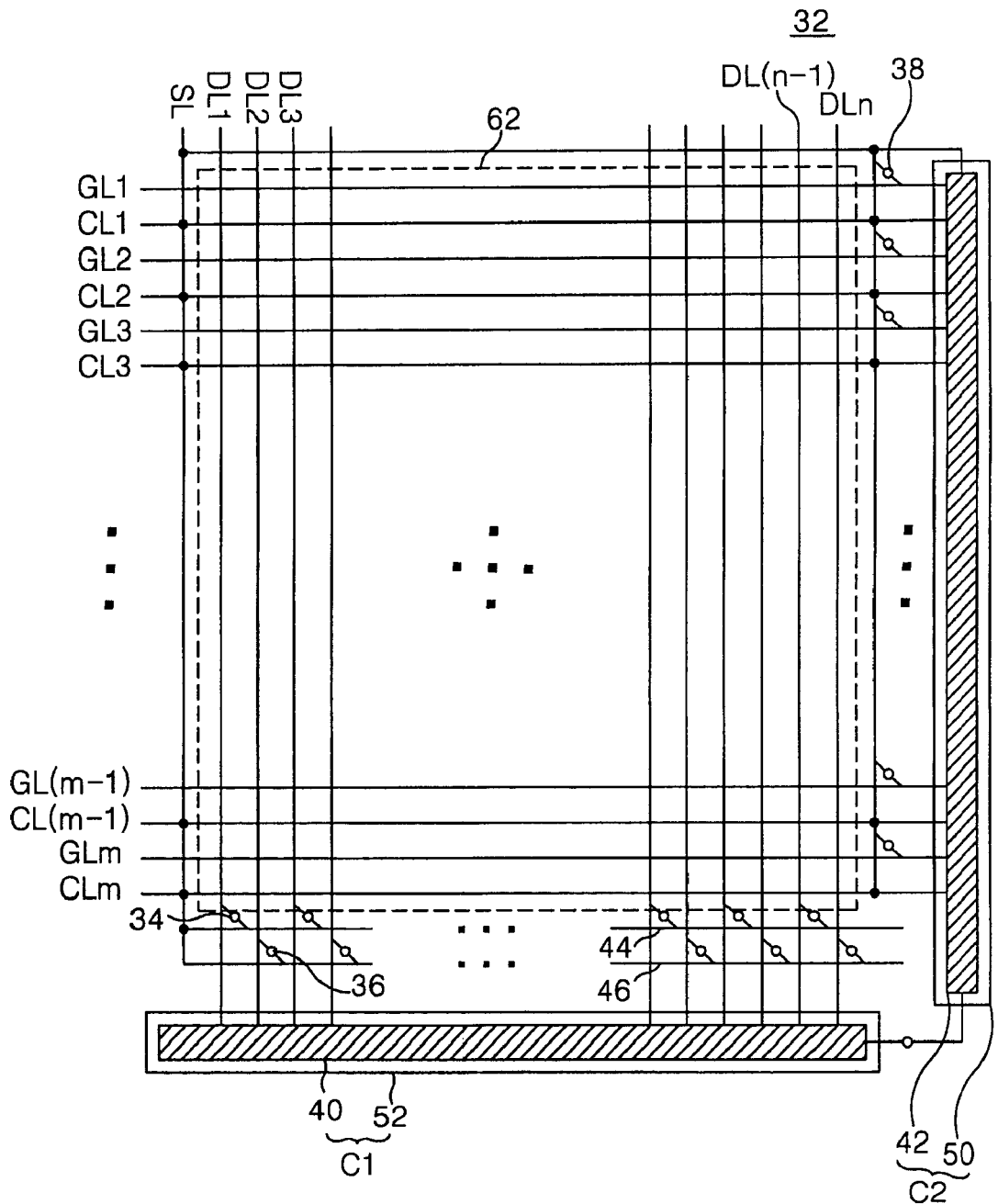
FIG. 2 is a plan view representing a horizontal electric field type liquid crystal display device according to the present invention.

FIG. 2 is a plan view representing a liquid crystal display device of In Plane Switching (IPS) mode according to the present invention.

Referring to FIG. 2, the liquid crystal display device of IPS mode according to the present invention includes a plurality of common lines CL1 to CLm to apply common voltages Vcom to common electrodes, a plurality of gate lines GL1 to GLm to apply gate voltages to the gate electrodes of TFTs, a plurality of data lines DL1 to DLn to apply data voltages to pixel electrodes through the drain electrodes of the TFTs, a first bypass capacitor C1 formed at an end of the data line DL1 to DLn, and a second bypass capacitor C2 formed at an end of the gate line GL1 to GLm. Herein, the common line CL, the gate line GL and the data line DL are formed in a display part 62, and the first and second bypass capacitors C1 and C2 are formed in a non-display part that does not include the display part 62.

The common lines CL1 to CLm are a number m of lines formed substantially parallel to the gate lines GL1 to GLm. Supply lines SL for applying a common voltage to the common lines CL1 to CLm are formed on both sides of a lower substrate 32 in a direction substantially perpendicular to the gate lines GL1 to GLm. The common lines CL are directly connected to a second shorting bar 42 or connected a third static electricity prevention circuit that is in connection with the second shorting bar 42.

The gate lines GL1 to GLm are a number m of lines formed alternate with and substantially parallel to the common lines CL1 to CLm and applies the gate voltages to the gate electrodes of the TFTs. The gate lines GL are connected to the third static electricity prevention circuit 38 respectively, or connected to the second shorting bar 42 directly.

The data lines DL1 to DLn are a number n of lines formed substantially perpendicular to the gate lines GL1 to GLm and apply data signals to pixel electrodes through the drain electrodes of the TFTs. Among the data lines DL, odd-numbered data lines DL1, DL3, . . . , DL(n–3), DL (n–1) are connected to a first shorting bar 40. Further, a first static electricity prevention circuit 34 may be provided between a first connection line 44 and the odd-numbered data lines DL1, DL3, . . . , DL(n–3), DL (n–1). Among the data lines DL, even-numbered data lines DL2, DL4, . . . , D(n–2), DLn are connected to the first shorting bar 40. Further, a second static electricity prevention circuit 36 may be provided between a second connection line 46 and the even-numbered data lines DL2, DL4, . . . , D(n–2), DLn.

Figure 3:
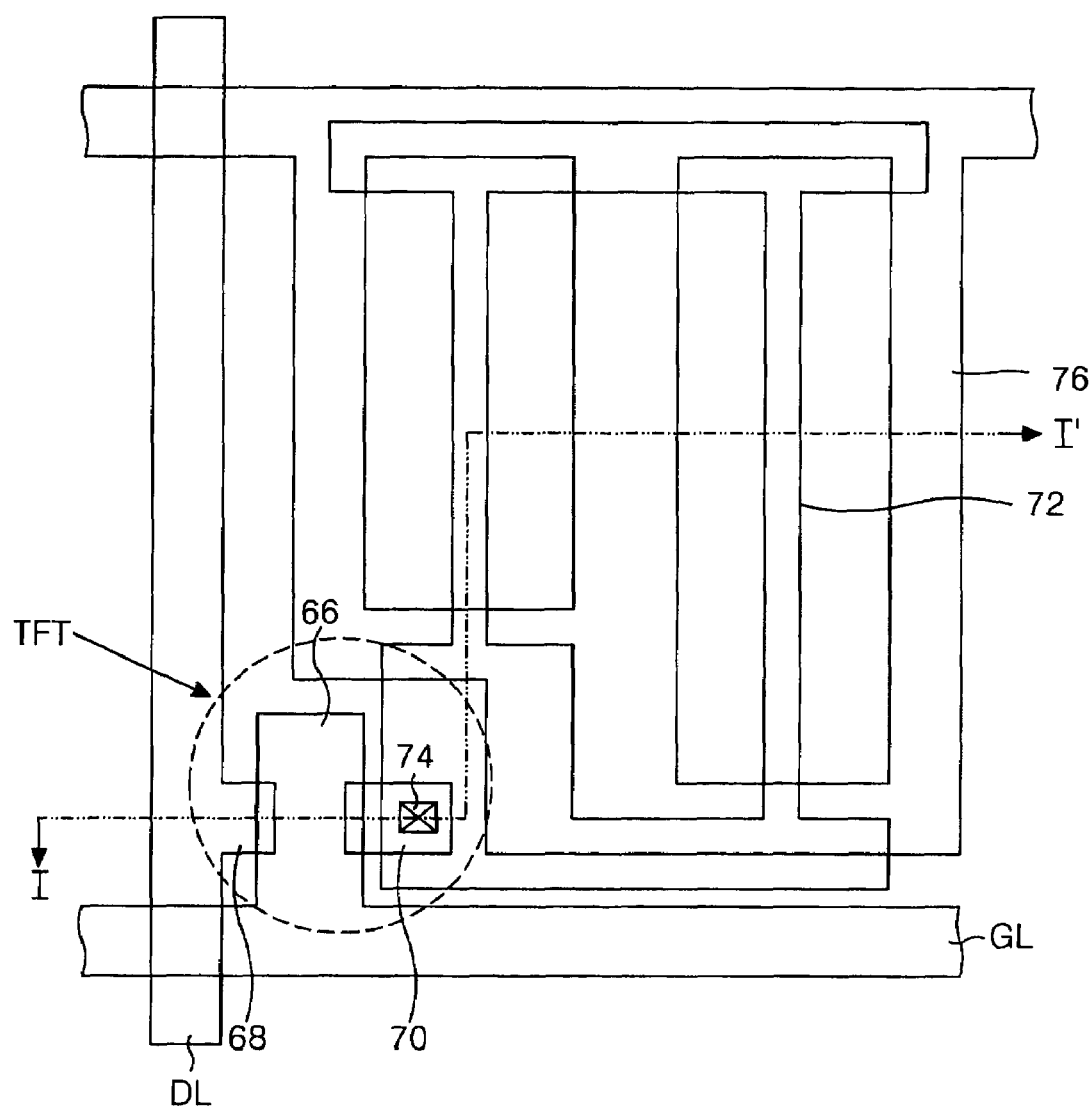
FIG. 3 is a plan view representing a pixel illustrated in FIG. 2 and formed at a crossing area of a gate line and a data line on a lower substrate.
Figure 4:
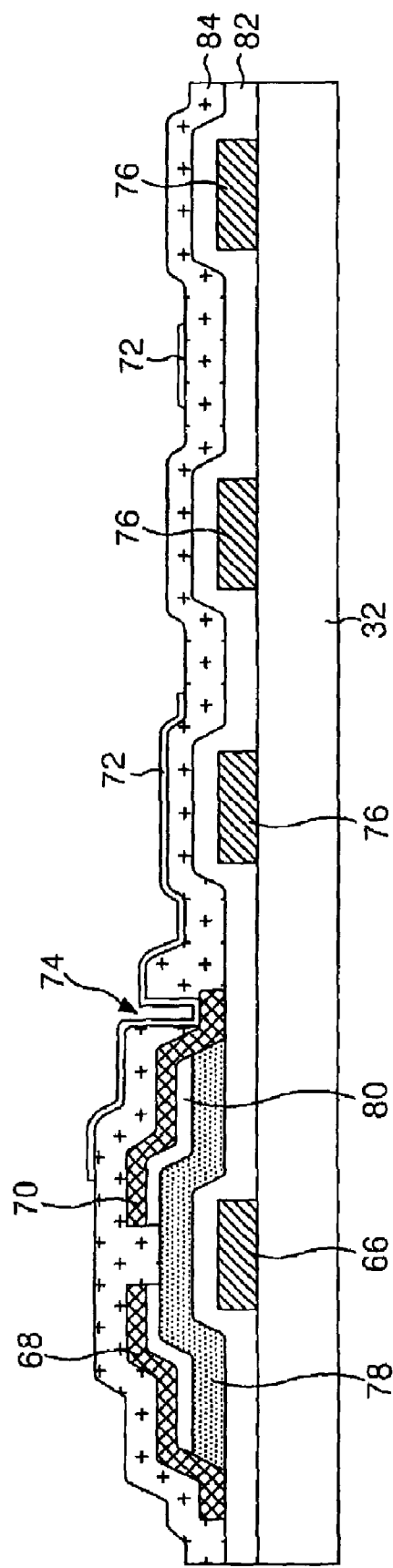
FIG. 4 is a sectional view representing the pixel taken along the line I-I' illustrated in FIG. 3.

In this way, as illustrated in FIGS. 3 and 4, TFTs are provided at crossing areas of the gate lines GL and the data lines DL on the lower substrate 32, and pixel electrodes 72 are arranged in a matrix at pixel areas defined by the data lines DL, the gate lines GL and the common lines CL. Further, common electrodes 76, which may have a stripe shape, are provided to form horizontal electric fields with and to be alternate with the pixel electrodes 72 at pixel areas.

The TFT includes a gate electrode 66 connected to the gate line GL, a source electrode 68 connected to the data line DL, and a drain electrode 70 connected to the pixel electrode 72 through a contact hole 74. Further, the TFT includes semiconductor layers 78 and 80 to form a conduction channel between the source electrode 68 and the drain electrode 70 by a gate voltage applied to the gate electrode 66. The semiconductor layers 78 and 80 are formed on a gate insulating film 82. Such a TFT selectively applies the data signal from the data line DL to the pixel electrode 72 in response to the gate signal from the gate line GL.

The pixel electrode 72 is located at the pixel area defined by the data lines DL and the gate lines GL, and is made from a transparent conductive material, of which the light transmittance is high. The pixel electrode 72 is formed on a protective layer 84 that is spread on the entire surface of the lower substrate 32 and is electrically connected to the drain electrode 70 through the contact hole 74 passing through the protective layer 84.

The common electrodes 76 are alternately located with the pixel electrodes 72 at the pixel areas defined by the data lines DL and the gate lines GL. The common electrode 76 is formed on the lower substrate 32 of the same metal as at least any one of the gate line GL, the data line DL and the pixel electrode 72.

Figure 5:
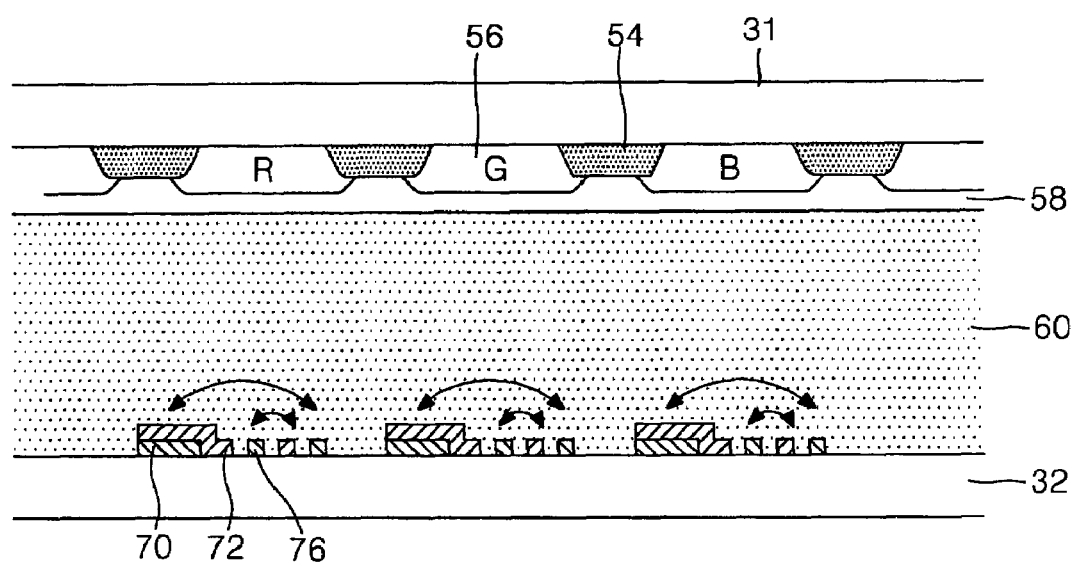
FIG. 5 is a sectional view representing the pixel illustrated in FIG. 2 on an upper substrate.

In this way, the lower substrate 32 where the TFT, the pixel electrode 72, the common electrode 76 and a lower alignment film (not shown) are formed, as illustrated in FIG. 5, is facing an upper substrate 31 where a black matrix 54, a color filter 56, a planarization layer 58 and an upper alignment film (not shown) are provided.

The black matrix 54 is formed in a matrix on the upper substrate 31 to divide the surface of the upper substrate 31 into a plurality of cell areas where the color filters 56 are formed, and at the same time acts to prevent light interference between adjacent cells. Color filters 56 of the three primary colors red, green and blue are provided on the upper substrate 31 that is divided into cells by the black matrix 54. The color filters 56 are formed of acrylic or polyimide resin containing pigments and are separated from each other on the black matrix. The color filters of each color may be separately formed to prevent the colors from mixing during the fabrication process. The planarization layer 58 to planarize the upper substrate 31 is provided on the surface of the color filter 56. The planarization is to prevent the color filter 56 from being contaminated and compensates the step difference between the red, green and blue color filters 56 that are separately formed.

In the liquid crystal display device, if a gate high pulse is applied to the gate electrode 66 of the TFT, a horizontal electric field corresponding to a difference voltage between a video data voltage and a common voltage is applied between the pixel electrode 72 and the common electrode 76 for a scan period while a channel is formed between the source electrode 68 and the drain electrode 70. The horizontal electric field causes the liquid crystal of a liquid crystal layer 60 to be driven, thereby controlling the amount of incident light from a backlight.

Figure 6A:
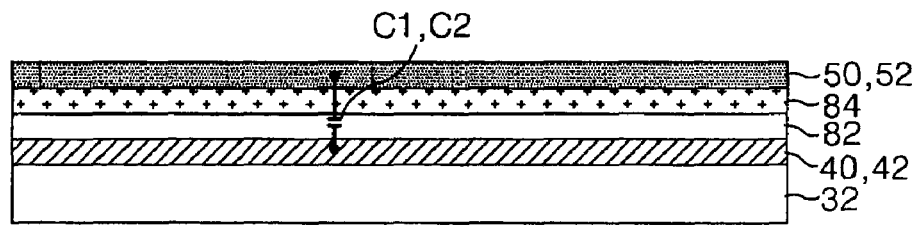
FIGS. 6A and 6B are sectional views representing first and second bypass capacitors illustrated in FIG. 2.
Figure 6B:
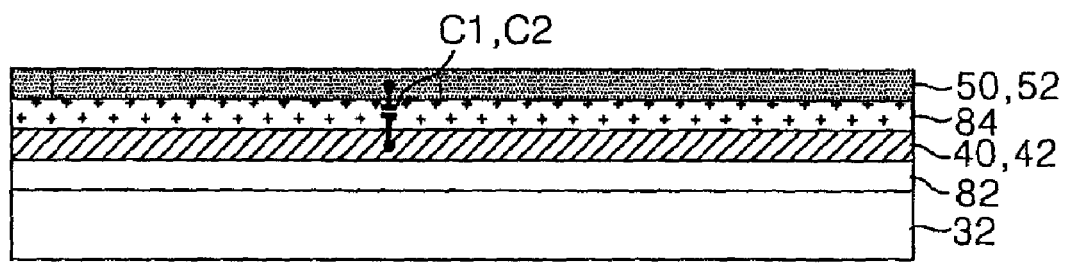

The liquid crystal display device according to the present invention has a first bypass capacitor C1 formed at a non-display area to be connected to the end of the data line DL. The first bypass capacitor C1, as illustrated in FIG. 6A, includes a first shorting bar 40 and a first dummy line 52 formed with a gate insulating film 82 and a protective film 84 therebetween. The first bypass capacitor C1, as illustrated in FIG. 6B, includes the first shorting bar 40 formed on the gate insulating film, the first dummy line 52 overlapping the first shorting bar 40, and the protective film 84. That is, the first shorting bar 40 may be formed of the same gate metal as the gate electrode 66, and the first shorting bar 40 and the gate electrode may be formed at the same time. Or, the first shorting bar 40 may be formed of the same data metal as the source and drain electrodes 68 and 70 and the first shorting bar 40 and the source and drain electrodes 68 and 70 may be formed at the same time. The first dummy line 52 may be formed of the same transparent conductive metal as the pixel electrode 72, and they may be formed simultaneously. The first dummy line 52 may be or may not be supplied with a designated electric field. Herein, the transparent conductive metal may include Indium Tin Oxide ITO, Indium Zinc Oxide IZO or Indium Tin Zinc Oxide ITZO.

If the first shorting bar 40 is formed of the gate metal, the first bypass capacitor C1 having the first shorting bar 40 and the first dummy line 52 is formed with the gate insulating film 82 and the protective film 84 therebetween. If the first shorting bar 40 is formed of the data metal, the first bypass capacitor C1 having the first shorting bar 40 and the first dummy line 52 is formed with the protective film therebetween.

The second bypass capacitor C2 is formed at the non-display area to be connected to the end of the gate line GL. The second bypass capacitor C2 having a second shorting bar 42 and a second dummy line 50 is formed with the protective film 84 or the gate insulating film 82 and the protective film 84. The second bypass capacitor C2, as illustrated in FIG. 6B, includes the second shorting bar 42 on the gate insulating film 82 and the second dummy line 50 formed to overlap the shorting bar 42 and the protective film 84, while having the shorting bar 42 and the protective film 84 therebetween. That is, the second shorting bar 42 may be formed of the same gate metal as the gate electrode 66, and the second shorting bar 42 and the gate electrode may be formed at the same time. Or, the second shorting bar 42 may be formed of the same data metal as the source and drain electrodes 68 and 70, and the second shorting bar 42 and the source and drain electrodes 68 and 70 may be formed at the same time. The second dummy line 50 is formed of the same transparent conductive metal as the pixel electrode 72, and they may be formed simultaneously. The second dummy line 50 may be or may not be supplied with a designated electric field.

If the second shorting bar 42 is formed of the gate metal, the second bypass capacitor C2 having the second shorting bar 42 and the second dummy line 50 is formed with the gate insulating film 82 and the protective film 84 therebetween. If the second shorting bar 42 is formed of the data metal, the second bypass capacitor C2 having the second shorting bar 42 and the second dummy line 50 is formed with the protective film 84 therebetween.

When there occurs an open in a bypass loop consisting of the first shorting bar 40 connected to the data lines DL, the second shorting bar 42 connected to the gate lines GL and the common lines CL having equipotential, the first and second bypass capacitors C1 and C2 store the remaining component within the liquid crystal display panel and slowly discharge the stored remaining component. In this way, even when the bypass loop is opened, DC components or power off signals remaining within the liquid crystal display panel is stored at the first and second bypass capacitors C1 and C2, thereby minimizing the damage of the liquid crystal display panel to improve picture quality.

As described above, the liquid crystal display device according to the present invention has the bypass capacitor formed to eliminate the remaining DC components caused by poor contact between the signal lines or the open of the bypass loop within the liquid crystal display panel. The bypass capacitor is realized with the shorting bar and the dummy line formed with the gate insulating film and/or the protective film therebetween. Since the bypass capacitor stores up the remaining DC component, it may be possible to prevent the picture quality deterioration at the display area of the liquid crystal display panel, which was caused by the remaining DC component.

It will be apparent to those skilled in the art that various modification and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a substrate of an in-plane switching liquid crystal display device having a display part and a non-display part;
   a gate line on the substrate;
   a common line substantially parallel to the gate line;
   a data line crossing the gate line and the common line while being insulated therefrom, to define a pixel area;
   at least one capacitor in the non-display part and connected to at least one of the gate line, the common line and the data line for storing a remaining electric charge component in the display part and eliminating the stored electric charge component;
   a common electrode in the display part of the substrate and connected to the common line;
   a thin film transistor at a crossing area of the gate line and the data line;
   a gate insulating film between the gate line and the data line;
   a protective film on the gate insulating film for protecting the thin film transistor; and
   a pixel electrode connected to the thin film transistor to form a horizontal electric field with the common electrode,
   wherein the component is a remaining electric charge component in the display part not induced from the outside, and
   wherein the capacitor includes:
   a first capacitor connected to at least one of the gate line and the common line; and
   a second capacitor connected to the data line,
   a first static electricity prevention means in the non-display part of the substrate and connected to the first capacitor; and
   a second static electricity prevention means in the non-display part of the substrate and connected to the second capacitor;
   wherein the first capacitor includes:
   a first shorting bar connected to the first static electricity prevention means;
   at least one layer of insulating film on the first shorting bar; and
   a first dummy line to overlap the first shorting bar on the at least one layer of insulating film.

2. The liquid crystal display device according to claim 1, wherein the first shorting bar includes the same metal as any one of the gate line and the data line.

3. The liquid crystal display device according to claim 1, wherein the first dummy line includes the same metal as the pixel electrode.

4. The liquid crystal display device according to claim 1, wherein the at least one layer of insulating film is the gate insulating film and the protective film.

5. The liquid crystal display device according to claim 1, wherein the at least one layer of insulating film is the protective film.

6. A liquid crystal display device, comprising:
   a substrate of an in-plane switching liquid crystal display device having a display part and a non-display part;
   a gate line on the substrate;
   a common line substantially parallel to the gate line;
   a data line crossing the gate line and the common line while being insulated therefrom, to define a pixel area;
   at least one capacitor in the non-display part and connected to at least one of the gate line, the common line and the data line for storing a remaining electric charge component in the display part and eliminating the stored electric charge component;
   a common electrode in the display part of the substrate and connected to the common line;
   a thin film transistor at a crossing area of the gate line and the data line;
   a gate insulating film between the gate line and the data line;
   a protective film on the gate insulating film for protecting the thin film transistor; and
   a pixel electrode connected to the thin film transistor to form a horizontal electric field with the common electrode,
   wherein the component is a remaining electric charge component in the display part not induced from the outside, and
   wherein the capacitor includes:
   a first capacitor connected to at least one of the gate line and the common line; and
   a second capacitor connected to the data line,
   a first static electricity prevention means in the non-display part of the substrate and connected to the first capacitor; and
   a second static electricity prevention means in the non-display part of the substrate and connected to the second capacitor;
   wherein the second capacitor includes:
   a second shorting bar connected to the second static electricity prevention means;
   at least one layer of insulating film on the second shorting bar; and
   a second dummy line to overlap the second shorting bar on the at least one layer of insulating film.

7. The liquid crystal display device according to claim 6, wherein the second shorting bar includes the same metal as any one of the gate line and the data line.

8. The liquid crystal display device according to claim 6, wherein the second dummy line includes the same metal as the pixel electrode.

9. The liquid crystal display device according to claim 6, wherein the at least one layer of insulating film is the gate insulating film and the protective film.

10. The liquid crystal display device according to claim 6, wherein the at least one layer of insulating film is the protective film.

11. A method of fabricating a liquid crystal display device comprising:

providing a substrate of an in-plane switching liquid crystal display device having a display part and a non-display part;
forming a gate line on the substrate;
forming a common line substantially parallel to the gate line;
forming a data line crossing the gate line and the common line while being insulated therefrom, to define a pixel area; and
forming at least one capacitor in the non-display part and connected to at least one of the gate line, the common line and the data line for storing a remaining electric charge component in the display part and eliminating the stored electric charge component,
wherein the component is a remaining electric charge component in the display part not induced from the outside, and
further comprising:
forming a common electrode in the display part of the substrate and connected to the common line;
forming a thin film transistor at a crossing area of the gate line and the data line;
forming a gate insulating film between the gate line and the data line;
forming a protective film on the gate insulating film for protecting the thin film transistor; and
forming a pixel electrode connected to the thin film transistor to form a horizontal electric field with the common electrode,
wherein the capacitor includes:
a first capacitor connected to at least one of the gate line and the common line; and
a second capacitor connected to the data line, and
further comprising:
providing a first static electricity prevention means in the non-display part of the substrate and connected to the first capacitor; and
providing a second static electricity prevention means in the non-display part of the substrate and connected to the second capacitor,
wherein the first capacitor includes:
a first shorting bar connected to the first static electricity prevention means;
at least one layer of insulating film on the first shorting bar; and
a first dummy line to overlap the first shorting bar on the at least one layer of insulating film.

12. The method of fabricating a liquid crystal display device according to claim 11, wherein the first shorting bar includes the same metal as any one of the gate line and the data line.

13. The method of fabricating a liquid crystal display device according to claim 11, wherein the first dummy line includes the same metal as the pixel electrode.

14. The method of fabricating a liquid crystal display device according to claim 11, wherein the at least one layer of insulating film is the gate insulating film and the protective film.

15. The method of fabricating a liquid crystal display device according to claim 11, wherein the at least one layer of insulating film is the protective film.

16. The method of fabricating a liquid crystal display device according to claim 11, wherein the second capacitor includes:
a second shorting bar connected to the second static electricity prevention means;
at least one layer of insulating film on the second shorting bar; and
a second dummy line to overlap the second shorting bar on the at least one layer of insulating film.

17. The method of fabricating a liquid crystal display device according to claim 16, wherein the second shorting bar includes the same metal as any one of the gate line and the data line.

18. The method of fabricating a liquid crystal display device according to claim 16, wherein the second dummy line includes the same metal as the pixel electrode.

19. The method of fabricating a liquid crystal display device according to claim 16, wherein the at least one layer of insulating film is the gate insulating film and the protective film.

20. The method of fabricating a liquid crystal display device according to claim 16, wherein the at least one layer of insulating film is the protective film.

* * * * *